United States Patent
Shacham et al.

(10) Patent No.: US 8,355,189 B2
(45) Date of Patent: Jan. 15, 2013

(54) REDUCING THE VISIBILITY OF COLOR CHANGES CAUSED BY COLOR PLANE REGISTRATION VARIATIONS IN HALFTONE COLOR PRINTING

(75) Inventors: Omri Shacham, Mitzpe Ramon (IL); Gidi Amir, Ness Ziona (IL); Mani Fischer, Haifa (IL); Dror Kella, Nes-Ziona (IL); David Savelzon, Rishon Le-Zion (IL); Oren Haik, Beer-Sheva (IL); Tamar Kashti, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 454 days.

(21) Appl. No.: 12/780,222

(22) Filed: May 14, 2010

(65) Prior Publication Data

US 2011/0279831 A1    Nov. 17, 2011

(51) Int. Cl.
*H04N 1/52* (2006.01)
*H04N 1/58* (2006.01)

(52) U.S. Cl. ........................ 358/533; 358/536

(58) Field of Classification Search .................. 358/1.9, 358/3.06, 3.2, 3.26, 518, 533–536, 540, 463, 358/521; 382/162, 167, 275, 294
See application file for complete search history.

(56) References Cited

U.S. PATENT DOCUMENTS

| | | | |
|---|---|---|---|
| 6,563,524 B1 | 5/2003 | Regimbal | |
| 6,985,256 B2 | 1/2006 | Cheng et al. | |
| 7,050,651 B2 | 5/2006 | Zaklika et al. | |
| 7,480,076 B2 * | 1/2009 | Wang | 358/1.9 |
| 7,639,391 B2 * | 12/2009 | Ishii | 358/1.9 |
| 7,675,651 B2 * | 3/2010 | Wang et al. | 358/3.06 |
| 2006/0170975 A1 * | 8/2006 | Wang | 358/3.06 |
| 2007/0024914 A1 * | 2/2007 | Chung et al. | 358/3.26 |
| 2008/0130055 A1 * | 6/2008 | Wang et al. | 358/3.06 |
| 2009/0231629 A1 | 9/2009 | Asai | |
| 2009/0310161 A1 | 12/2009 | Kawamura | |
| 2011/0102847 A1 * | 5/2011 | Wang et al. | 358/3.06 |

OTHER PUBLICATIONS

Lukac, R., et al., Normalized Color-Ratio Modeling for CFA Interpolation, Publication Date: Mar. 2004, pp. 737-745, http://www.comm.utoronto.ca/~kostas/Publications2008/pub/52.pdf.

Glenbard Graphics, Tom Pettey, Spekta—A Revolution in Screening Technology, http://www.screen.co.jp/ga_dtp/en/news/pdf/newsbox/vol12_pdf/NewsBox_Vol12_New_Edition_2.pdf, News Box, New Edition, vol. 12, pp. 1-6, Undated.

Ulichney, Robert, Digital Halftoning, MIT Press, 1987, p. 42.

* cited by examiner

*Primary Examiner* — Scott A Rogers

(57) ABSTRACT

A set of screens is provided for use in printing respective color separations in a halftone color printing process. This set of screens comprises at least two clustered-dot screens and the frequency and angle parameter values of the screens is such that the lowest frequency moiré produced by any combination of at least two frequency components, taken from the group comprising the first and second screen harmonics, for which the sum of the harmonic orders of the frequency components in the combination is less than a predetermined value, is of a sufficiently high frequency as to be substantially unperceivable to the human visual system; other moirés are also substantially unperceivable to the human visual system. The lowest frequency moiré serves to reduce the visibility of color changes caused by color plane registration variations. A printing system and method employing the screen set are also provided.

25 Claims, 8 Drawing Sheets

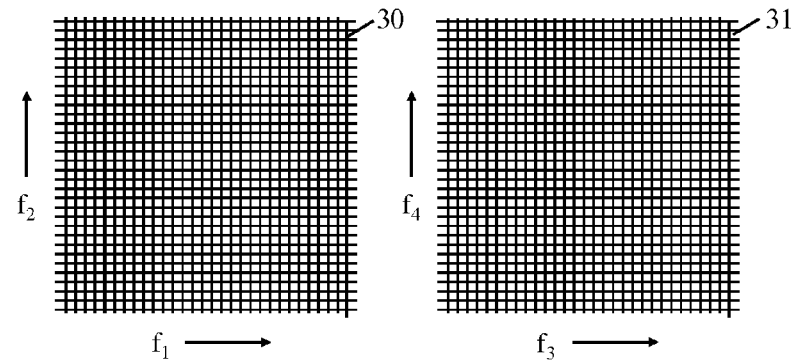
Figure 3
$f_1=f_2=f_3=f_4$
$\alpha = 15°$
$(1,0,-1,0)$ moiré
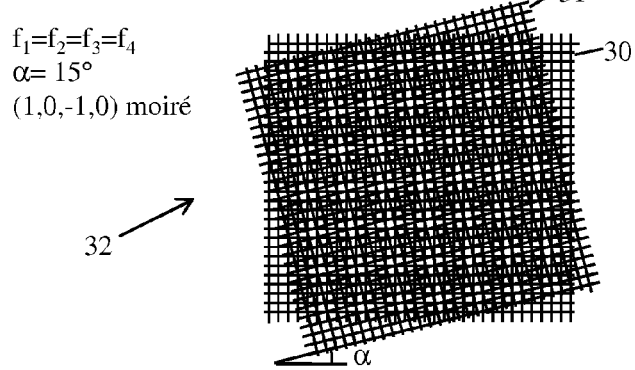
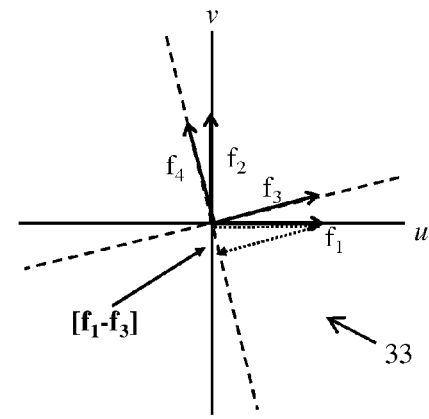
$f_1=f_2=f_3=f_4$
$\alpha = 34.5°$
$(1,2,-2,-1)$ moiré
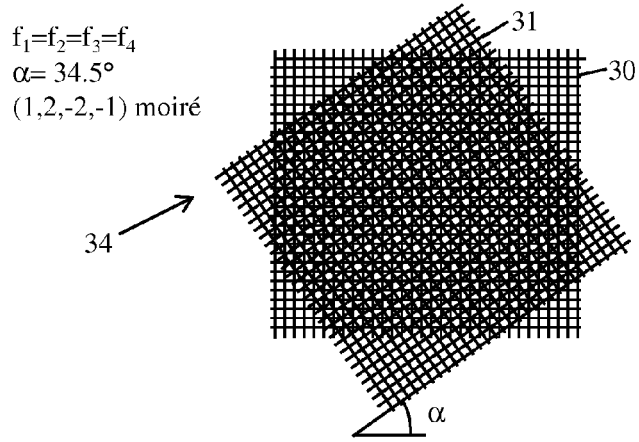
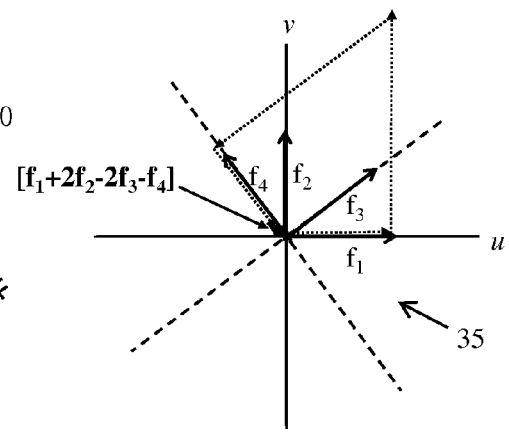
$f_1=f_2=0.77f_3=0.77f_4$
$\alpha = 45°$
$(1,1,-1,0)$ moiré
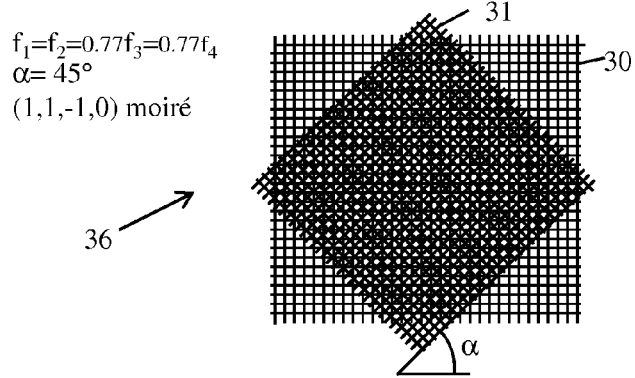
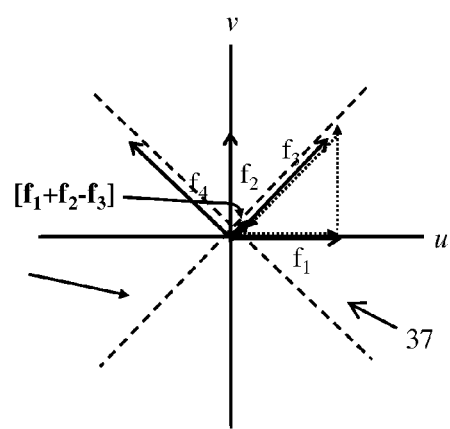

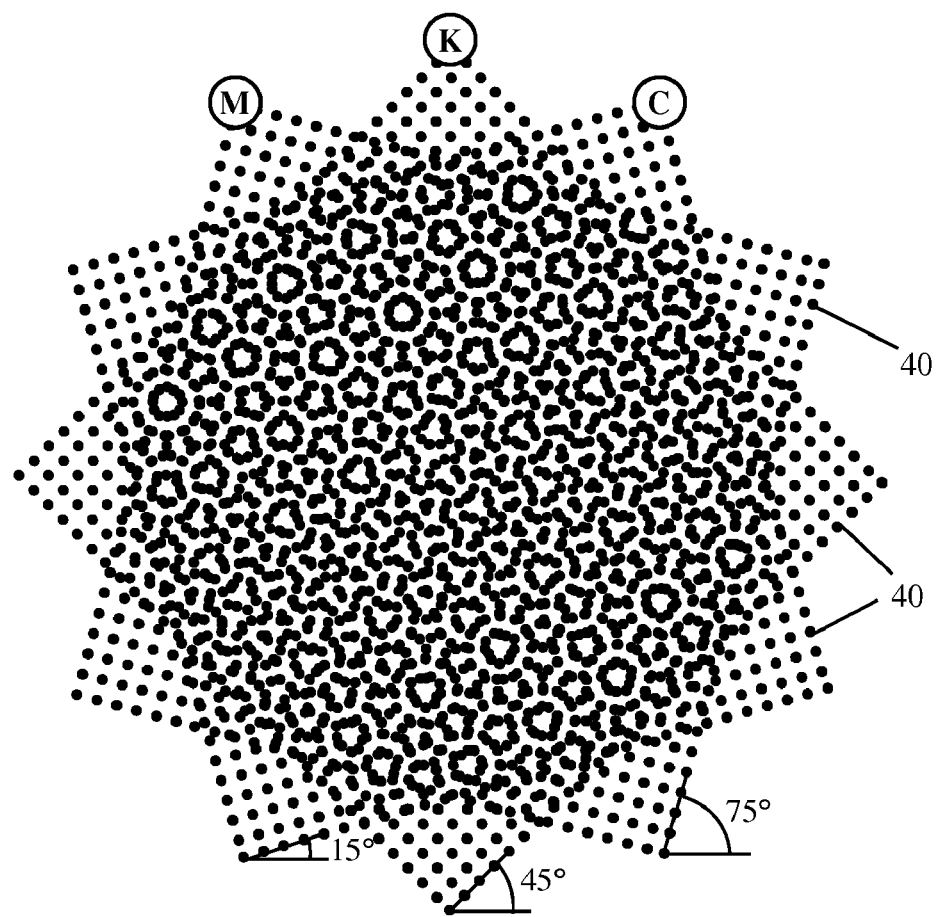
Figure 4
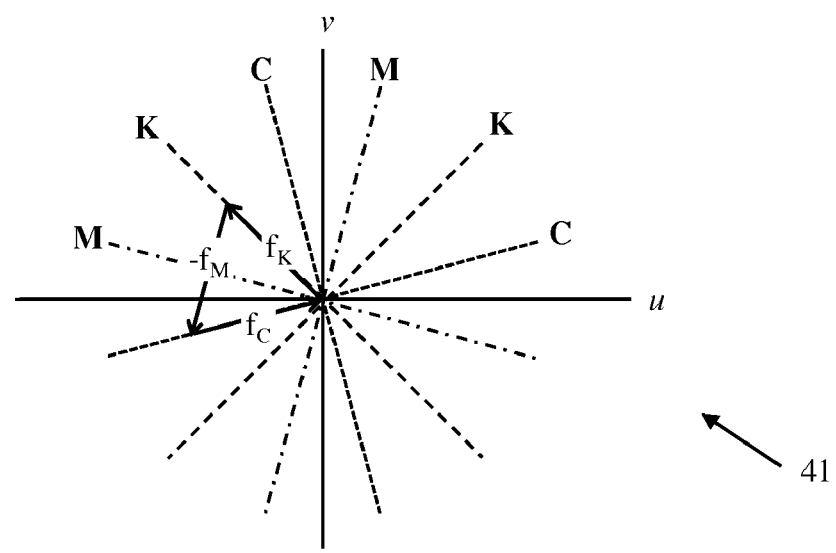
(0,1,-1,0,1,0) moiré

REDUCING THE VISIBILITY OF COLOR CHANGES CAUSED BY COLOR PLANE REGISTRATION VARIATIONS IN HALFTONE COLOR PRINTING

BACKGROUND

As is well known, most commercial color printing uses three or four primary colour inks, typically: Cyan (C), Magenta (M), Yellow (Y) and usually also Black (K). A color image to be printed is first separated into a respective layer (colour plane) for each ink and each of these layers is then printed, one on top of the other, using a halftoning process.

The need for halftoning arises from the fact that most existing printing devices are bi-level, that is, they are only capable of printing solid ink on a media substrate or leaving the media unprinted, and are unable to produce intermediate ink tones. With halftoning the original continuous tone image (or each of its color planes) is transformed into a distribution of small dots whose size or number varies depending on the tone level to be produced. When printed this gives to the eye (looking from a normal viewing distance) an illusion of a full range of intermediate tone levels even though the printing device is only bi-level.

Many halftoning methods are currently in use; however, most of the high and medium quality image printing is done using a halftoning method with clustered-dot elements. In this method each of the color planes of the original continuous tone image is transformed into a regular screen of equidistant dots where the size of the screen dots varies according to the image tone level but the frequency and angle of the screen remains fixed; this is known as AM (amplitude modulated) halftoning. Each such halftone screen is characterized by three parameters: the screen angle (the direction in which the screen dots are aligned); the screen frequency (the number of screen dots per inch or centimeter in the direction of the screen); and the dot shape.

As a result of interference between halftone screens printed in superposition, macrostructures in the form of one or more moiré patterns may appear and a careful choice of the screen angles and frequencies is required to minimize moiré visibility.

In one screen combination commonly used for color printing, the screens all have the same frequency and the screen of the black ink, which is the most prominent color, is set to 45 degrees with the cyan and magenta screens being set to 45±30 degrees, namely 15 and 75 degrees. These angles differences of 30 degrees between the superposed screens are large enough to make the strong moiré between the first harmonics of each pair of layers practically disappear. The fourth screen, belonging to the yellow ink to which the eye is much less sensitive, is placed at 15 degrees from two of the other screens (usually at 0 degrees). This commonly-used screen combination is very sensitive to small angle or frequency deviations so that any slight misalignment will result in a moiré becoming visible.

The superposition of dot screens, as well as giving rise to the potential for moiré-pattern macrostructures, also produces microstructures not present in the original screens. These microstructures, known as 'rosettes', are two to five times the periods of the screens and are local groupings of the superposed screen dots. It is the variation in the form of the rosettes across the superposed screens, due to the screen frequencies and angles, that produce the macrostructure moirés. Even with constant tone images (uniform dots), changes in form of the rosettes across the superposed screens, for whatever reason, will gives rise to changes in both the reflected OD (Optical Density) and perceived color.

As a consequence, not only is it highly desirable to use moiré-free screen geometries, but in order to keep consistent colors within the page and among pages, printing devices need to maintain consistent registration among the color planes. Registration changes between color planes result in a different overlap which, in turn, leads to a different form of rosette and thus a change in reflected OD color. Registration changes may arise for a variety of reasons such as mechanical features of the printer, mechanical shocks, deformations of the printing substrate (typically paper), etc. Failure to maintain consistent registration can result in visible bands on the printed page with a changed color and OD, as well as different colors across the page and between pages.

SUMMARY OF THE INVENTION

According to the present invention, there is provided a set of halftone dot screens as set out in accompanying claims, the set of screens serving to reduce the visibility of color changes caused by color plane registration variations. Halftone printing methods and apparatus embodying the present invention are also provided as set out in accompanying claims.

BRIEF DESCRIPTION OF THE DRAWINGS

Embodiments of the invention will now be described, by way of non-limiting example, with reference to the accompanying diagrammatic drawings, in which:

FIG. 3 is a diagram illustrating the creation of moirés between two square grids;

FIG. 4 is a diagram of the superposition of three dot screens in a moiré-free combination;

DETAILED DESCRIPTION

In order to facilitate an understanding of the present invention, a brief description will first be given of the moiré phenomenon in relation to halftone screens. This description uses substantially the same notation and terminology as set out in the book "The Theory of the Moiré Phenomenon", Amidror Isaac, Volume I, 2nd edition, Springer 2009.

Figure 1:
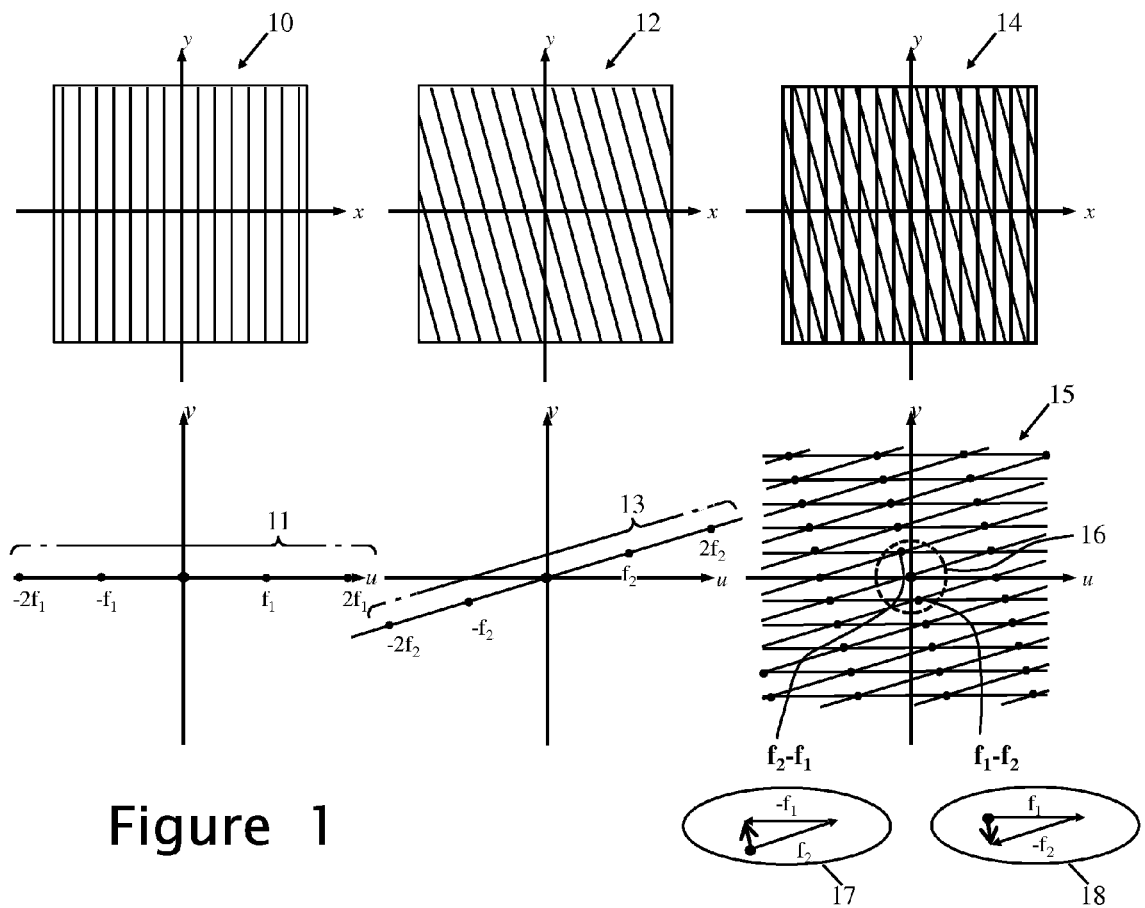
FIG. 1 is a diagram illustrating, both in the image domain and the spectral domain, the creation of a moiré pattern between two gratings.

Referring to FIG. 1, a binary grating 10 is shown relative to orthogonal spatial coordinate axes x and y, this form of representation of the grating being hereinafter referred to as an 'image plane' representation. The binary grating is formed by parallel black lines (reflectance value of '0') between which are white spaces (reflectance values of '1'). The repetition frequency of the lines is $f_1$.

An alternative representation of the grating 10 can be derived by Fourier analysis of the grating 10 (or, more properly, its reflectance function); this results in an infinite impulse comb in the frequency domain with impulses at $\pm f_1$ (the fundamental frequency) and its higher harmonics, the amplitude of these impulses being enveloped by a sin c function. Below the image plane representation of the grating 10 in FIG. 1 is shown a 2D spectral plane representation of the grating; the spectral plane has a frequency axis u corresponding to the spatial axis x and an orthogonal frequency axis v corresponding to the spatial axis y. In the spectral plane, the impulse comb 11 for the grating 10 extends in both directions along the u axis with impulses at $\pm f_1$, $\pm 2f_1$, etc, each impulse being represented by a black dot. The impulse comb also includes a zero frequency or "DC" impulse.

Also shown in FIG. 1 is a second binary grating 12 the lines of which are angled relative to the lines of the grating 10. The repetition frequency of the lines of the second grating 12 is $f_2$. Due to the angling of the grating 12, the grating has frequency components in both the x and y directions. As for the grating 10, in the frequency domain the grating 12 takes the form of an infinite impulse comb with impulses at the fundamental frequency (in this case $f_2$) and its higher harmonics. Below the image plane representation of the grating 12 in FIG. 1 is shown its 2D spectral plane representation; this is similar to that for the grating 10 except that the impulse comb 13 of the grating 12 is angled with respect to the u axis reflecting the fact that the grating 12 has spatial frequency components in both the x and y directions.

The superposition of gratings 10 and 12 in the image plane is shown at 14 in FIG. 1 and, as can be seen, this results in the production of a clearly visible moiré sloping upwards left to right. The superposition of the gratings is equivalent to a multiplication of the reflectance values of the superposed areas of the two gratings—a black area (reflectance value '0') always wins over a white area (that is, 0×1=0). The corresponding operation in the spectral (frequency) domain is therefore convolution of the impulse combs 11, 13 of the two gratings 10, 12 and the result, an impulse "nail bed", is shown at 15 in FIG. 1. Graphically, the convolution can be performed by centering a copy of one comb over each and every impulse of the other comb, each impulse position then marking the position of an impulse of the convolution. Each impulse of the convolution is thus the vector sum of two frequency components taken one from each of the impulse combs 11, 13 of the gratings 10 and 12. Each convolution impulse that is not in a position corresponding to an impulse of the original impulse combs, is associated with a moiré. However, most of these moirés will not be visible, either because they are too weak or they are of too high a frequency to be perceivable by the human visual system. Dashed circle 16 is the 'visibility circle' outside of which moirés will be too high in frequency to be visible. In the present case, only the impulse comprising the frequency components $f_2$ and $-f_1$ (see vector diagram 17) and the complementary impulse $f_1-f_2$ (see vector diagram 18) are visible, this impulse pair corresponding to the moiré that can be seen in the superposition 14.

Figure 2:
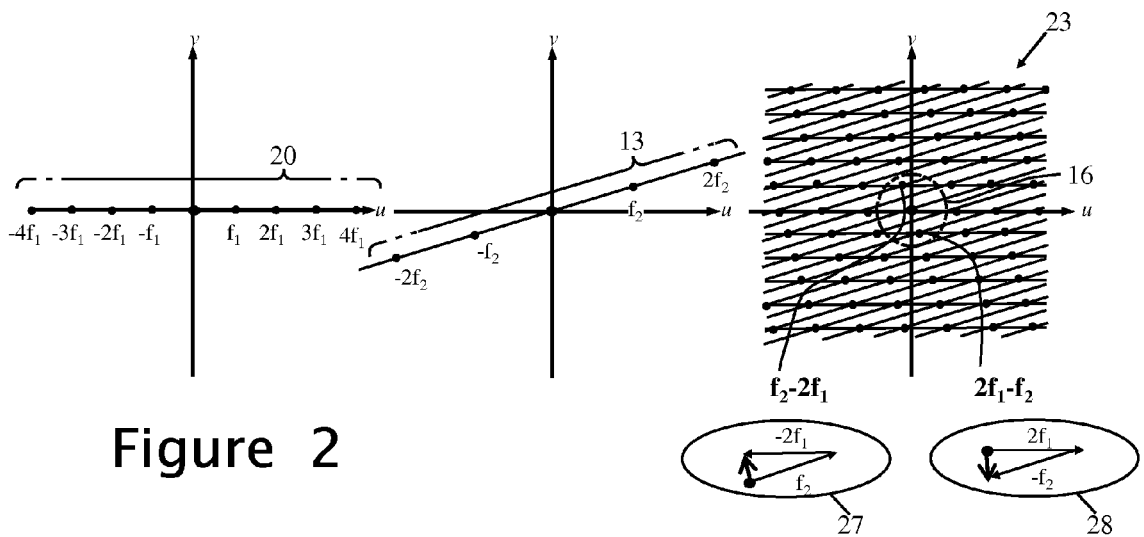
FIG. 2 is a diagram illustrating, in the spectral domain, the creation of another moiré pattern between two gratings.

Although in the FIG. 1 example the visible moiré corresponds to a vector combination of the fundamental frequencies $f_1$ and $f_2$ of the two gratings involved, this will not always be the case and FIG. 2 shows an example in which the visible moiré corresponds to a vector combination of the fundamental frequency of one grating and the second harmonic frequency of a second grating. More particularly, the FIG. 2 example is based on first and second gratings that are the same as gratings 10 and 12 respectively of FIG. 1 except that the first screen of the FIG. 2 example has a value of $f_1$ half that of the grating 10 of the FIG. 1 example. The impulse combs of these first and second gratings are shown at 20 and 13 respectively in FIG. 2; the convolution of these combs is shown at 23. The convolution impulses lying within the visibility circle 16 and resulting in a visible moiré now correspond to the vector combination of the frequency components $f_2$ and $-2f_1$ (see vector diagram 27) and its complement $2f_1-f_2$ (see vector diagram 28).

So far as macrostructure features such as moirés are concerned, the superposition of halftone screens is similar to the superposition of square grids where a 'square grid' is the superposition of two orthogonal line gratings. FIG. 3 depicts two such square grids 30 and 31, the square grid 30 being formed from two orthogonal gratings with respective line frequencies of $f_1$ and $f_2$ and the square grid 31 being formed from two orthogonal gratings with respective line frequencies of $f_3$ and $f_4$. In the spectral plane the two square grids present impulse nail beds similar to that shown at 15 in FIG. 1 (but with the impulses aligned parallel to the two axes u and v reflecting the orthogonal relationship of the constituent gratings).

FIG. 3 shows three different moiré-generating superpositionings 32, 34, 36 of the square grid 31 on the square grid 30. The angle α of the grid 31 relative to the grid 30 differs in all three superpositionings 32, 34, 36, the values of α being respectively 15°, 34.5° and 45°. In each of the superpositionings 32 and 34 the frequencies $f_1$, $f_2$, $f_3$, $f_4$ are the same whereas for the superpositioning 36 $f_1=f_2=0.77f_3=0.77f_4$.

In the spectral domain the superpositioning of two square grids corresponds to the convolution of their impulse nail beds which results in a further impulse nail bed; each impulse of this latter nail bed has two frequency components from the impulse spectrum of each of the square grids involved (in fact, each of the four gratings making up the two grids contributes a respective frequency component) whereby each impulse of the convolution is made up of four frequency components each a different one of the fundamental frequencies $f_1$, $f_2$, $f_3$, $f_4$ or one of its harmonics (or the corresponding DC component). Each frequency component can be indicated by a respective integer value in a sequence of values, the position in the sequence corresponding to the grating contributing the component and the value indicating the order (first, second, third, etc.) of the harmonic of the grating frequency contributed, with '0' indicating the DC component. Such a sequence of values serves to identify the impulse concerned and the related moiré. By way of example, assuming the gratings making up the grids 30 and 31 are ordered in correspondence to their line frequency suffixes 1 to 4, the sequence (1,0,−1,2) indicates an impulse with components of: $+f_1$ from the grating with line frequency $f_1$, 0 (the DC component) from the grating with line frequency $f_2$, $-f_3$ from the grating with line frequency $f_3$, and $2f_4$ from the grating with line frequency $f_4$. The frequency vector of the impulse can be determined as the vector sum of its components as indicated in the identifying sequence of values. The same approach of using a sequence of values to identify convolution impulses and their related moirés can also be employed where the number of superimposed gratings or square grids is greater (or less) than the four gratings (two grids) of FIG. 3—for example, the visible moiré in FIG. 1 can be identified as the (1,−1) moiré and that of FIG. 2 as the (2,−1) moiré.

Impulses and any related moirés can be classified by the order of the highest-order frequency component contributing to the impulse or moiré (i.e., the highest value in the identifying sequence of values). Thus, for example, an impulse/moiré which only has fundamental-frequency components, is a "first order" impulse/moiré whereas an impulse/moiré which is the vector sum of a fundamental frequency component and a second harmonic component is a "second order" impulse/moiré.

In FIG. 3, the superposition 32 of the square grids 30, 31 results in a strong visible (1,0,−1,0) moiré the frequency of which is the vector sum ($f_1-f_3$); this is depicted in vector diagram 33 (in this diagram 33, and also the diagrams 35 and 37 referred to below, the coordinate axes relevant to grids 30 and 31 are respectively shown in continuous and dashed lines, the frequency vectors of the fundamental frequencies $f_1, f_2, f_3, f_4$ are shown in bold lines, and the vector sum giving the frequency of the impulse/moiré of interest is shown in dotted lines). The superposition 34 of the square grids 30, 31 results in a barely visible (1,2,−2,−1) moiré the frequency of which is the vector sum ($f_1+2f_2-2f_3+f_4$); this is depicted in vector diagram 35. The superposition 36 of the square grids 30, 31 results in a visible (1,1,−1,−0) moiré the frequency of which is the vector sum ($f_1+f_2-f_3$); this is depicted in vector diagram 37.

As already noted, the superpositioning of halftone dot screens produces similar moiré macrostructures as arise from the superpositioning of square grids, this being because a dot screen is simply a generalisation of a square grid. The shape of the dot used in a dot screen has a significant influence on the amplitude but not on the frequency of the moirés. FIG. 4 depicts the superposition of three dot screens 40 (one for each of the color separations K, M, C as indicated on each screen by the corresponding letter) at the common angling for these screens (namely 45°, 75°, 15° and as described earlier). The dots of each screen are aligned in two orthogonal directions and have the same period. Provided the screen frequencies and angling are accurate, a potentially strongly-visible (0,1,−1,0,1,0) moiré is absent because the contributing frequency vectors sum to zero (in the sequence (0,1,−1,0,1,0) the screens are taken in the order K, M, C). Vector diagram 41 shows the vector sum of the contributing vectors $f_K$, $-f_M$, $f_C$, (the coordinate axes for the K, M, and C screens being respectively shown by dashed, chain-dashed and dotted lines); it is noted that the perpendicularly and negatively symmetric cases giving the same zero sum are omitted for clarity. Any inaccuracy in the frequency or angle of any one of the screens, results in the strong appearance of the (0,1,−1,0,1,0) moiré.

Figure 5:
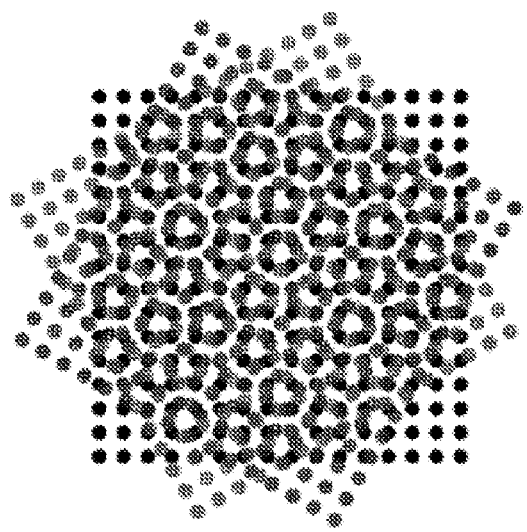
FIG. 5 is a diagram of clear-centered rosette patterns generated by the superposition of three AM dot screens in one registration.
Figure 6:
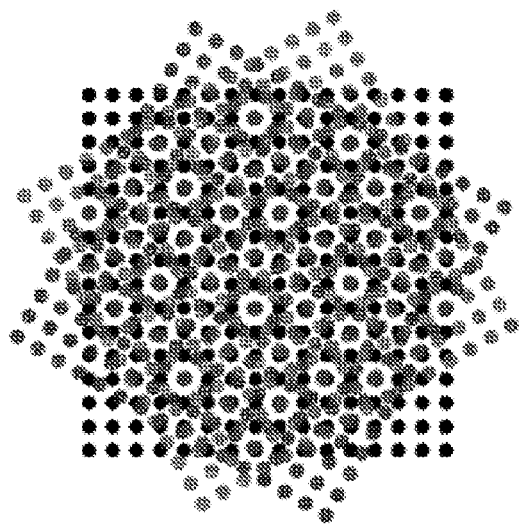
FIG. 6 is a diagram of dot-centered rosette patterns generated by the superposition of the same three AM dot screens as in FIG. 5 but now in a different registration.

In addition to the moiré macrostructures described above, superposed AM dot screens give rise to microstructure rosettes—indeed, it is the variation in the form of these rosettes across the superposed screens due to the screen frequencies and angles, that produce the macrostructure moirés. Typical rosette patterns are shown in FIGS. 5 and 6; the rosette pattern changes between clear-centered (FIG. 5) and dot-centered (FIG. 6), due to displacement (change of registration) between the major color planes (CMK). Changes in color plane registration (CPR) causes changes in the overlap of the screen dots of the different colors, thus producing a different set of Neugebauer primaries, which in turn causes a visible chromatic change ΔE that can get as high as 4 depending on the color mix (where ΔE is the Euclidean distance between two colors in the CIE L*a*b* color space). Even small displacements in the order of tens of microns may result in visible color shifts. By way of example, a displacement of 70 microns of one of the color planes in a 175 LPI (Lines Per Inch) screen will fully change the rosettes produced from clear-centered to dot-centered. CPR changes can arise for a number of reasons, notably due to mechanical features of the printer concerned, mechanical shocks, and print media deformations (as may occur in large offset presses where the paper dimensions may change when passing from one color impression to the other).

Figure 7:
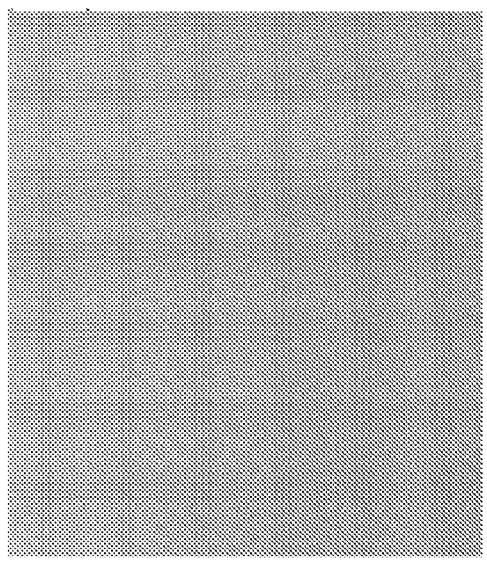
FIG. 7 shows a printed page exhibiting banding as a result of mis-registration between color planes during printing.

FIG. 7 shows, in grayscale, an example of banding caused on a page by CPR variations.

In order to minimize the undesirable color changes arising from CPR variations, embodiments of the invention serve to obscure such color changes by imposing a high frequency shift between rosette patterns, this being achieved by selecting screen geometries (frequencies, angles) to produce a high frequency moiré as the predominant moiré. The selected screen geometries are such that no discernable moirés exist within the circle of visibility.

From the above discussion of the moiré phenomenon in relation to dot screens, it will be appreciated that there exists a large number of potential combinations of the frequency components associated with superposed dot screens, that could give rise to moirés. However, the moirés of interest are most likely to be produced by combinations of the DC and the first and second order harmonics of the superposed screens. More particularly, moirés of interest are most likely to have a frequency produced by combining component first and second harmonics from multiple screens where the sum of the harmonic orders of the components is less than six (thus, for a set of three screens, the (2,−1,1,0,−1,0) moiré would be of interest as its harmonic orders sum to five, but the (2,−1,2,0,−1,0) moiré would not as its harmonic orders sum to six,—it being appreciated that the signs associated with the harmonic order in the sequences (2,−1,1,0,−1,0) and (2,−1,2,0,−1,0) are not relevant and are to be ignored). Symmetry considerations also substantially reduce the combinations most useful to consider.

Figure 8:
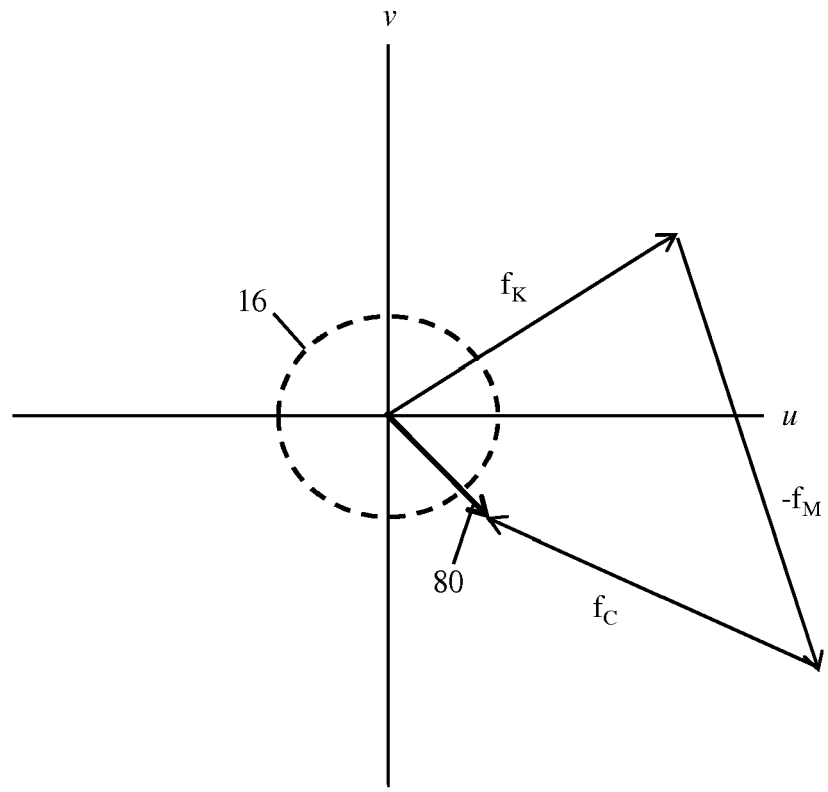
FIG. 8 is a vector diagram of screen frequencies combining to produce a predominant high frequency moiré in accordance with one example embodiment of the invention.
Figure 9:
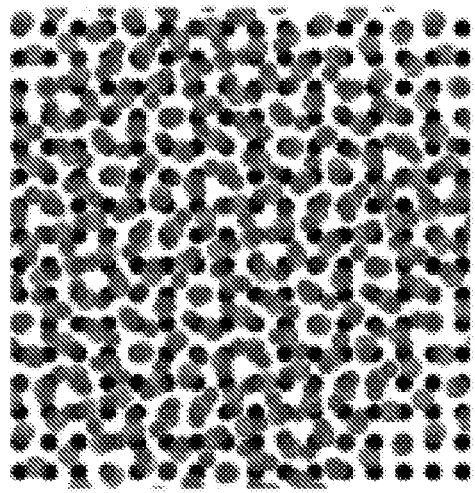
FIG. 9 is a diagram showing the pattern produced by a high frequency alternation between dot-centered and clear-centered rosettes produced by an example high-frequency moiré screen design embodying the invention.

FIG. 8 shows one example combination of the fundamental frequency vectors $f_K$, $f_M$, $f_C$ for the three main separations (that is, for the C, M and K screens, here assumed to each have the same frequency along both coordinate axes), the illustrated combination giving rise to a predominant high frequency moiré 80 (the moiré with the lowest frequency, made from any combination of the first and second screen harmonics for which the sum of the orders of the harmonics in the combination is less than six) which lies outside the circle of visibility 16 and which serves to obscure color changes resulting from CPR changes. More particularly, for the FIG. 8 example:

| Separation | lpi | angle |
| --- | --- | --- |
| K | 191.70 | 32.01 |
| M | 239.6 | 100.30 |
| C | 201.39 | 70.35 | and the depicted predominant moiré is the (1,0, −1,0, 0,1) moiré (screen ordering of K, M, C) with a frequency of 68 LPI. The perpendicular and opposite symmetrical cases have been omitted for clarity. The effect of the moiré 80 is to shift the perceived rosettes patterns quickly between dot-centered and clear-centered forms. FIG. 9 shows the resultant pattern which, as can be seen, is a mix over a relatively small area of both dot-centered and clear-centered rosettes. This mix is perceived as an average color which stays the same under any color plane displacement, and as a result reduces bands visibility and increases color stability under local CPR change.

Of course, the selection of appropriate screen geometries should take into account also higher order frequency vectors, to make sure that they do not combine to produce a moiré that is significantly visually discernible. It is to be understood that even should a moiré fall within the circle of visibility 16 due to its frequency, it may not actually be visible because its amplitude is too small; in this respect, second and higher harmonics will inherently be of lesser amplitudes than the DC or fundamental frequency components.

In one group of embodiments, the predominant high frequency moiré (the moiré with the lowest frequency, made from any combination of the first and second screen harmonics for which the sum of the orders of the harmonics in the combination is less than six) is formed from fundamental frequency components from the screens of the three major color separations (CMK) thereby involving all three color planes in the obscuring of changes in rosette form due to CPR variations.

When selecting screen geometries, the above restrictions will generally exist alongside other ones previously known, for example for avoiding press/screen interference.

The present invention is applicable both to photographic halftoning and to digital halftoning. Due to the widespread use of digital halftoning in modern printers, including laser and inkjet printers, a description is given below of an embodiment of the present invention in the context of a printer using digital halftoning.

With digital halftoning, the halftone screens are not physical but are functionally embodied in the halftone processing of an input digital image. More particularly, in digital printing, the input image to be printed normally takes the form (possibly after some initial processing) of bitmap data representing, for each color separation (typically the four separations C, Y, M, K), the intensity of input image pixels as an n-bit quantization (where, for example, n=8). However, for each color, the printer can only print, or not print, output pixels that are typically arranged according to a print grid 101 (see FIG. 10). Digital halftone processing of the input image serves to determine, for each color separation, which output pixels are to be printed to reproduce the input image in accordance with halftoning principles.

Figure 10:
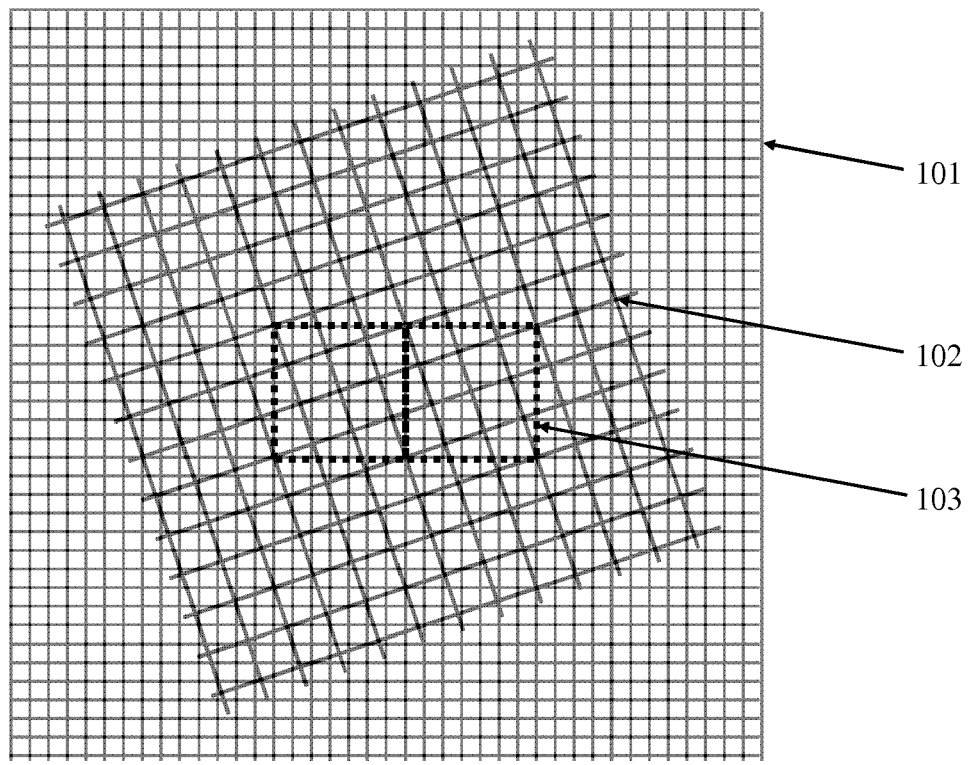
FIG. 10 is a diagram showing the relationship between a print grid, cell grid and tiles of a digital halftoning process.

The most common forms of halftoning convert each color plane input image into AM halftone dots organised according to a selected screen ruling and angle with each dot being formed within a corresponding cell of the screen; the notional grid of cells forming the screen is referenced 102 in FIG. 10 and effectively overlies the print grid 101 (there being a different cell grid for each color separation). A halftone clustered dot is formed in a cell by the selective printing of a cluster of an appropriate number of the corresponding output pixels in dependence on the tone to be reproduced (this tone will depend on the tone of a corresponding part of the input image for the color separation concerned, and potentially other factors such as diffused errors). The halftone processing uses reference data (the nature of which depends on the nature of the halftone process being used) that effectively embodies the selected screen frequency and angle for the color separation concerned; for example, when a thresholding halftone process is employed, the thresholding matrix embodies the screen frequency and angle.

Figure 11:
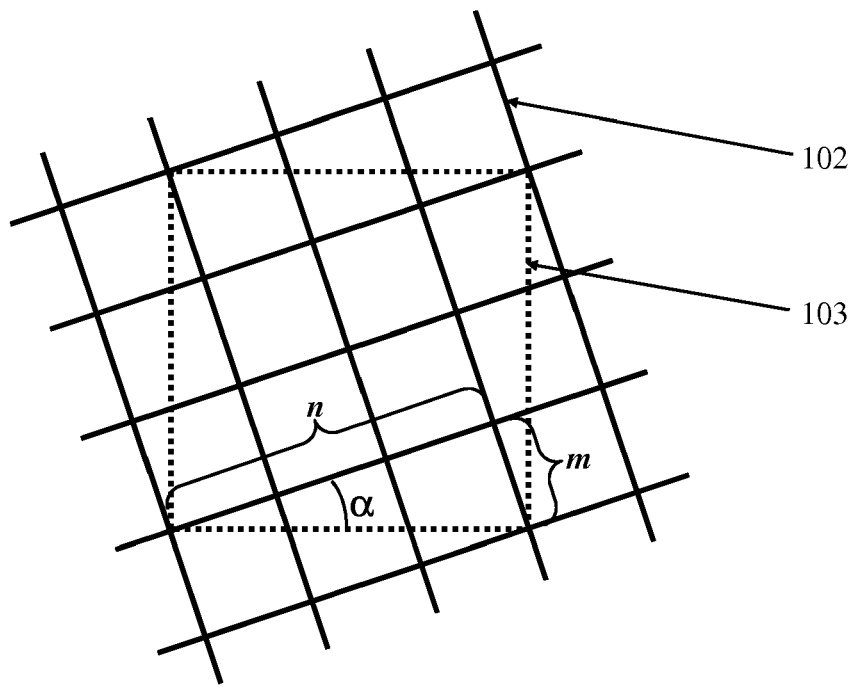
FIG. 11 is an enlargement of part of FIG. 10.

Halftone processing computations effected across the entire input image are time consuming. To reduce the computation volume, the input image is typically fragmented into identical squares of N×N output pixels called tiles (different tiles for each separation); two such tiles 103 are shown in bold dotted outline in FIG. 10). For each tile a similar halftone procedure is carried out (for example, comparison of respective parts of the input image with the same threshold matrix). The use of tiling, however, limits the geometric options, since only rational tangent angles can be used, and only specific screen rulings are available. More particularly, to enable the same matrix to be applied to each tile, each tile must cut the cell grid in the same way. (Another way of viewing this is to consider the threshold matrix as defining a portion of the cell grid with the full cell grid being formable by tessellation of this one cell grid portion.) This implies that the tile grid junctions must lie on cell grid junctions (up to an overall displacement, which is insignificant). Referring to FIG. 11 which is an enlargement of part of the cell grid 102 and a tile 103 of FIG. 10, it can be seen that the following conditions must be met for tiling to be efficiently employed:

$$\tan(\alpha)=m/n$$

$$\text{tile size } N=l\times(\text{cell size})\times\sqrt{(m^2+n^2)}$$

where: α is the screen angle and l, m, n are integers.

Other practical limitations also exist most notably due to the characteristics of the target printer (the one on which the screens are to be used), for example:

how many dots (output pixels) per inch, DPI, the target printer is capable of printing, the fundamental frequency of each screen, LPI, being related to DPI by:

$$LPI=\{DPI/(N)\}\times\sqrt{(m^2+n^2)}$$

tile size (N) in terms of output pixels (for example ≦256 with (tile size)/4 being an integer), and the acceptable range of the screen fundamental frequencies (lines per inch, LPI), for example 140<LPI<240.

It may also be desired to limit one or more of the screens to being regular screens—as used herein, a "regular screen" is defined to mean a screen in which each cell has the same output-pixel structure, that is, the location of the printable output pixels within each cell is the same; this implies a specific relationship between the cells and the print grid that places limitations on screen angle. Greater flexibility in screen angle selection is possible if non-regular screens are also (or alternatively) used.

Practical limitations on cell and tile sizes and their interrelation to each other (and to the print grid) thus serve to limit the screen frequencies and angles available. As a result, in one example embodiment, the selection of an appropriate set of screens embodying the present invention is effected in accordance with the process 120 depicted in the flow chart of FIG. 12. The depicted selection process is, for example carried out using a general purpose computer and results in the generation of halftone data files (for example, containing threshold matrices) corresponding to a selected set of screens, that can be installed on a target printing system.

As can be seen, the selection process 120 comprises two main stages, namely a first stage 121 in which the screen geometries of a suitable set of screens are determined, and a second stage in which the pixel growth order (for forming halftone spots of increasing size) is decided. It is the first stage 121 that is primarily of relevance to the present invention.

At step 123 of the first stage 121, a set of suitable screen angles and frequencies is determined based on the cell and tiling constraints imposed by the target printing system. In step 124, a set of three screen geometries (one for each of the major color separations C, M, K) is chosen from within the acceptable set of screen angles and frequencies determined in step 123. In step 125 an evaluation is carried to ascertain whether the screen geometries chosen in step 124 produces moirés suitable to provide the effect sought, namely the obscuring of color changes due to screen mis-registration. The evaluation 125 comprises a first sub-step 126 in which the predominant moiré (the moiré with the lowest frequency, made from any combination of the first and second screen harmonics for which the sum of the orders of the harmonics in the combination is less than six) is determined. In a second sub-step 127 the frequency of the predominant moiré is checked to see if it lies outside the circle of visibility (that is, has a frequency greater than a threshold value in the range sixty to sixty five cycles per inch); if this is not the case, the current set of screen geometries is abandoned and processing returns to step 124 to select a new set of geometries. However, provided the predominant moiré is outside the circle of visibility, sub-step 128 is next performed to determine whether there are any other significantly visible moirés (this could be based on amplitude computations or by monitoring—automatically or by eye—either a printed superposition of the screens or test prints produced using the screens); where such visible other moirés are found, the current set of screen geometries is abandoned and processing returns to step 124 to select a new set of geometries. Provided no visible moirés are found in sub-step 128, the current set of screen geometries is accepted as suitable and processing proceeds to the second stage 122. After the second stage processing, a final step 129 is carried out in which halftone data files (for example, containing threshold matrices) are generated corresponding to the selected set of screens.

Two example sets of suitable screen geometries are given in the following tables, it being appreciated that the color assigned to each screen will depend on the separations used in the printing system under consideration. Tile size N is expressed in output pixels. As previously noted, the screen angle is given by $\tan^{-1}(m/n)$ and the screen fundamental frequency LPI by: $LPI=\{DPI/(N)\}\times\sqrt{(m^2+n^2)}$.

FIRST EXAMPLE

For a target printer with DPI=812.8 (32 dots per millimeter).

| Separation | m | n | N | LPI | angle |
|---|---|---|---|---|---|
| First | 15 | 24 | 120 | 191.70 | 32.01 |
| Second | 4 | 22 | 76 | 239.6 | 100.30 |
| Third | 28 | 10 | 120 | 201.39 | 70.35 |

This set produces a predominant moiré at 68 LPI and, with first second third separations of K, M, and C, is the screen set up represented in FIG. 8.

SECOND EXAMPLE

For a target printer with DPI=812.8 (32 dots per millimeter).

| Separation | m | n | N | LPI | angle |
|---|---|---|---|---|---|
| First | 3 | 5 | 124 | 191.70 | 30.96 |
| Second | 35 | 13 | 152 | 199.65 | 69.62 |
| Third | 7 | 43 | 148 | 239.26 | 99.25 |

Some variation in the above-stated frequency and angle values is possible for the same DPI value, the extent of such variation being functionally limited by the need to avoid visible moirés while still providing for a reduced visibility of color changes caused by CPR variations (the permissible extent of variations in frequency and angle values can readily be determined empirically). Of course, different values of DPI will lead to different LPI values according to the formula previously given.

Figure 13:
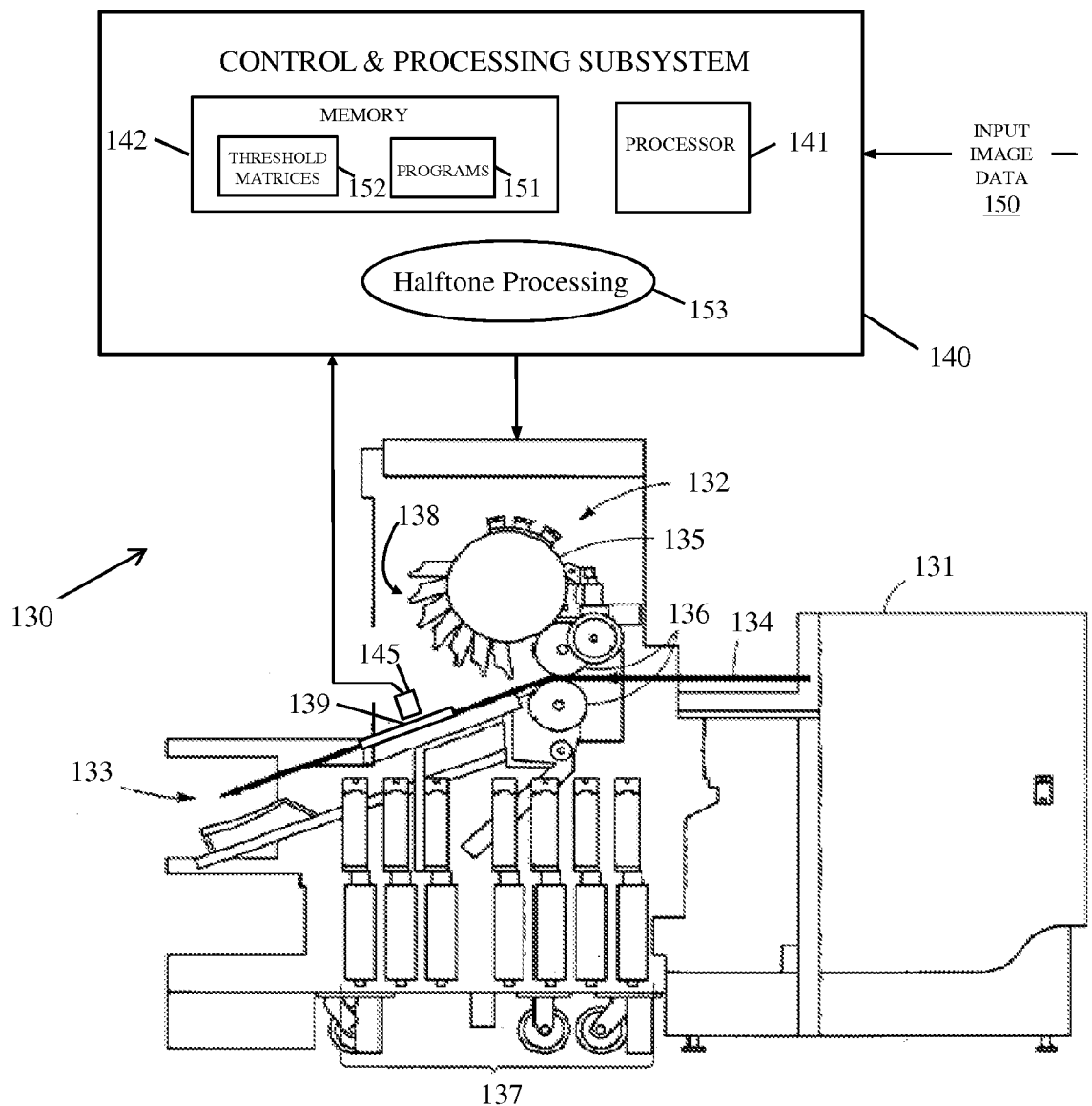
FIG. 13 is a diagram of a printing system employing halftone screens embodying the invention.

FIG. 13 depicts an example color printing system 130 employing screens embodying the invention, the system being arranged to receive input image data 150 and print one or more corresponding color prints upon a substrate such as paper, labels, transparencies, etc. For example, the color printing system 130 may be a digital press, such as an HP Indigo digital printing press available from Hewlett-Packard Company.

The color printing system 130 includes a media feed unit 131, a print engine 132, and an output handling unit 133. In operation, media is transferred along a path 134 from the media feed unit 131 to the print engine 132 for the formation of printed images and subsequently outputted to the output handling unit 133. The color printing system 130 further includes a control and processing subsystem 140 arranged to receive and process the input image data 150 thereby to generate control signals for feeding to the print engine 132 to cause it to print a corresponding print.

In the depicted example, the print engine 132 is configured to implement electro-photographic imaging operations to form latent images in responsive to the control signals fed to it from the control and processing subsystem 140, and to develop the latent images using marking agents of a plurality of different colors—in the present example printing system, four inks, cyan, magenta, yellow and black are used as marking agents. More particularly, the print engine 132 uses a photoconductive drum 135 to successively form a latent image for each color to be printed. Each latent image is then developed through the application of a thin layer of the appropriate ink to the drum 135 using a corresponding developer unit 138. Each developed color image is transferred via imaging drums 136 to media within the media path 134 (a single media sheet 139 is shown in FIG. 13). The described exemplary print engine 132 is arranged to receive the inks from a plurality of reservoirs 137 configured to store the inks of the different colors. Other configurations of the print engine 132 are, of course, possible.

The control and processing subsystem 140 is typically in the form of a program controlled processor 141, and associated computer-readable storage medium (memory) 142 comprising both volatile and non-volatile sections. The memory 142 stores a set of programs 151 for causing the processor 141 to control the operation of the printing system 130 and to carry out processing including, in particular, halftone processing 153 of the input image data 150 using, in the present example, threshold matrices 152 stored in the memory 142, one per ink (color separation). The threshold matrices 152 serve to provide a set of screens embodying the present invention. The set of programs 151 may also effect initial color management processing of the input image data 150 to derive appropriate ink coverage values. The memory 142 also serves as a temporary store for intermediate processing results. It will be appreciated that the control and processing subsystem 140 may take other forms such as dedicated hardware (for example an ASIC or suitable programmed field programmable array).

In operation, the printing system 130 operates in standard manner to effect halftone printing of color images using the screens embodied in the threshold matrices 152; as described above, due to the frequency and angles of the screens, the color-changing effect of CPR variations is reduced.

The printing system 130 may also include a CPR sensor 145 for detecting CPR variations. CPR sensors are known in the art (see, for example, U.S. Pat. No. 6,563,524, Hewlett-Packard Development Company). The sensor 145 output is fed to the control and processing subsystem 140 and the latter is arranged to process the sensor output to detect changes indicative of changes in color plane registration. Where printing has initially been undertaken using a screen set that does not embody the present invention (the screen set having been chosen for other characteristics), the control and processing subsystem 140 can be arranged to monitor the level of changes detected using the sensor 145, and upon these changes reaching or exceeding a predetermined threshold, substitute for the initial screen set, a second set of halftone dot screens that embodies the present invention for continued printing. One way of detecting CPR changes is to sense the color of a predetermined part of the image being printed in order to detect variations; changeover between screen sets can be arranged to occur when the variations in sensed color (as measured, for example, in the CIE La*b* color space) reach or exceed a threshold value. It would alternatively be possible to initiate changeover between screen sets upon a human operator observing color variations in printed images indicative of CPR changes.

Figure 12:
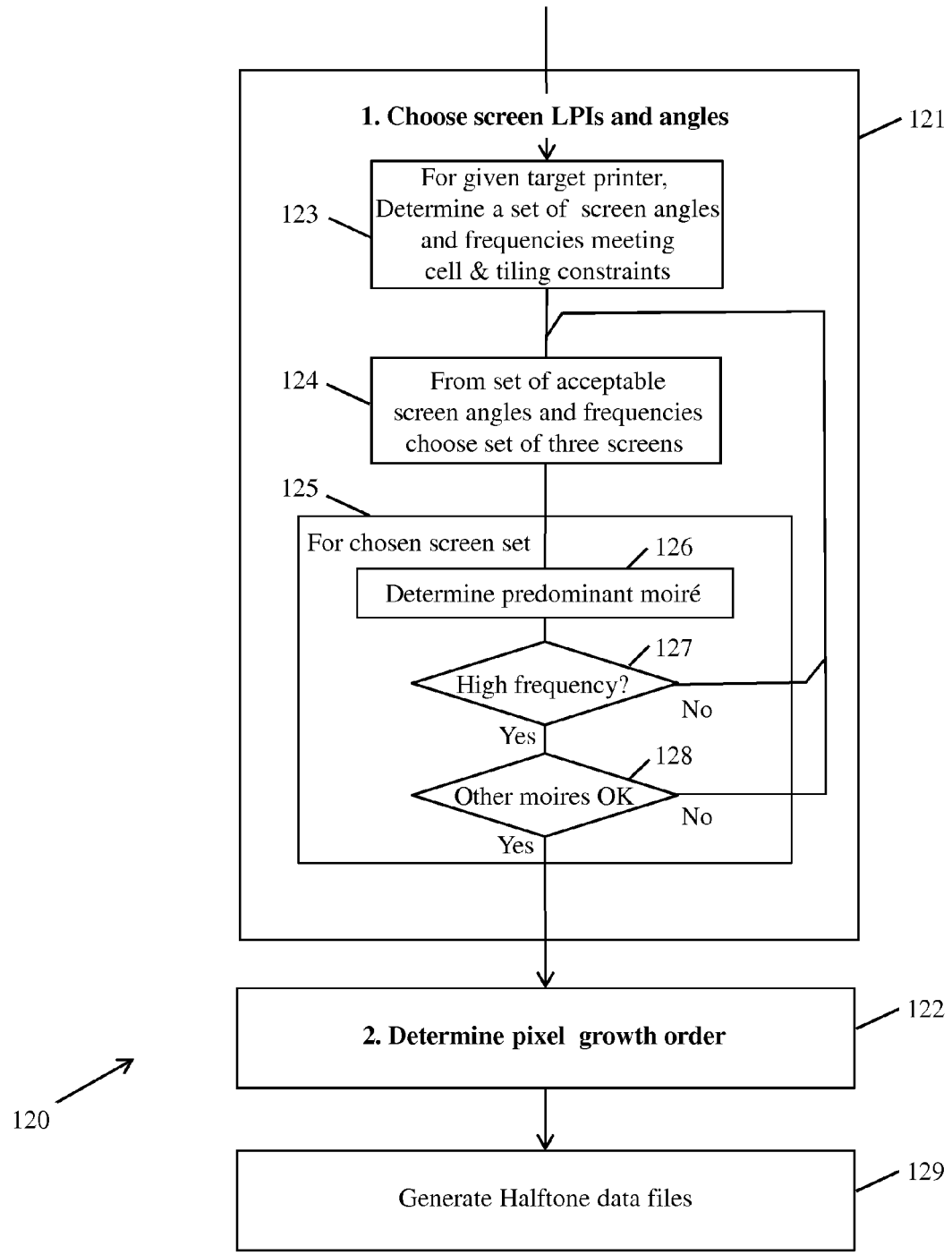
FIG. 12 is a flow chart of a process for selecting a set of screen geometries embodying the invention.

Although the selection of a set of screen geometries in accordance, for example, with the method of FIG. 12, will generally be performed by computing apparatus separate from the printing system, it would be possible to provide the printing system 130 with sufficient computational power to carry out the selection of a set of screen geometries embodying the present invention.

It will be appreciated that many variations are possible to what has been described above. For example, while the above-described embodiments relate to C, Y, M, K color separations, other colors or combinations of colors can alternatively be used. Also, although in the foregoing description only screens for the three major color separations were considered when determining the predominant moiré, it is possible to take account of more screens at the cost of increased computational effort. For simplicity, in the foregoing example embodiments it has been assumed that each screen has the same frequency in both coordinate directions and that the screen dots align in two orthogonal directions, however, it is also possible to have screens with different fundamental frequencies in their two coordinate directions and/or for the screen dots align in two non-orthogonal directions though this will increase the computation required to find a suitable set of screen geometries. The halftone dots can be of any desired shape. Furthermore, although specific mention has been made of halftoning processes using threshold matrices, it will be understood that for embodiments employing digital halftoning, any halftoning process implicitly using screens can be employed. Embodiments of the invention can be employed with any printer capable of bi-level printing of multiple separations. The set of screens may also comprise one or more line screens.

In the FIG. 12 method, the predominant moiré of a chosen screen set was determined in step 126 as the lowest frequency moiré produced by any combination of at least two frequency components, taken from the group comprising the first and second screen harmonics, for which the sum of the harmonic orders of the frequency components in the combination is less than six. However, the restrictions on the combinations of frequency components looked at to determine the lowest frequency moiré can be varied from the foregoing; for example, the sum of the harmonic orders of the frequency components could be limited to a different maximum value higher or lower than six, or the screen harmonics considered restricted to first harmonics or expanded to include third (and potentially higher) harmonics. In one embodiment, the value limiting the sum of the harmonic orders of the frequency components could be made such that all moiré-producing combinations of first and second screen harmonics are taken into account when determining the afore-said lowest frequency moiré. Increasing the search space will, of course, consume more computational resources, while restricting the search space runs the risk of missing a low frequency moiré that will be visible.

From the foregoing it can be seen that embodiments of the invention provide reduced visibility of color bands in printing devices and improves color consistency and uniformity. Screens embodying the invention thus improve print quality and enable the development of lower cost printing systems for a given print quality.

The invention claimed is:

1. A set of screens for use in a halftone color printing process, said set comprising at least two clustered-dot screens, and the frequency and angle parameters for each of the screens in the set being such that:
   the lowest frequency moiré produced by any combination of at least two frequency components, taken from the group comprising the first and second screen harmonics, for which the sum of the harmonic orders of the frequency components in the combination is less than a predetermined value, is of a sufficiently high frequency as to be substantially unperceivable to the human visual system, and
   other moirés are also substantially unperceivable to the human visual system; said lowest frequency moiré serving to reduce the visibility of color changes caused by color plane registration variations.

2. A set of screens according to claim 1, wherein said predetermined value is such that said 'any combination of at least two frequency components for which the sum of the harmonic orders of the frequency components in the combination is less than the predetermined value' comprises all moiré-producing combinations of first and second screen harmonics.

3. A set of screens according to claim 1, wherein said predetermined value is six.

4. A set of screens according to claim 1, further comprising at least one line screen.

5. A set of screens according to claim 1, wherein the dots of each clustered-dot screen run in two orthogonal directions with equal periods in each direction.

6. A set of screens according to claim 1 in the form of photographic screens.

7. A set of screens according to claim 1 embodied in threshold matrices stored in or on a computer readable medium.

8. A set of screens according to claim 7, wherein the threshold matrix for each screen defines a portion of a cell grid with each cell delimiting a site for formation of a clustered dot in dependence on threshold values held in the matrix, the full cell grid being formable by tessellation of said cell grid portion and being angled at angle $\alpha$ to the matrix where $\tan \alpha$ is a rational number.

9. A set of screens according to claim 7, wherein at least one of the screens is non-regular.

10. A set of screens according to claim 1, wherein the dots of each clustered-dot screen run in two orthogonal directions with equal periods in each direction, and each clustered-dot screen is embodied in a respective square N×N threshold matrix stored in or on a computer readable medium where N is an integer representing the size of the matrix in terms of the number of output pixels covered, the threshold matrix for each screen defining a portion of a cell grid with each cell delimiting a site for formation of a clustered dot in dependence on threshold values held in the matrix, the full cell grid being formable by tessellation of said cell grid portion and being angled at angle α to the matrix where tan α equals m/n with m and n being integers, the fundamental frequency LPI of each screen being related to the output-pixel resolution DPI of a target printer by:

$$LPI=\{DPI/(N)\}\times\sqrt{(m^2+n^2)}.$$

11. A set of screens according to claim 10, wherein the set of screens is one of the group comprising the following sets of non-regular clustered-dot screens:

| Separation | m | n | N |
|---|---|---|---|
| First | 15 | 24 | 120 |
| Second | 4 | 22 | 76 |
| Third | 28 | 10 | 120 |
| First | 3 | 5 | 124 |
| Second | 35 | 13 | 152 |
| Third | 7 | 43 | 148 | where the angle of each screen is given by $\tan^{-1}(m/n)$ and the screen fundamental frequency by: $LPI=\{DPI/(N)\}\times\sqrt{(m^2+n^2)}$; said group further comprising sets of screens which have substantially similar frequency and angle values to the afore-specified group members and also provide a reduced visibility of color changes caused by color plane registration variations.

12. A halftone color printer including a set of halftone dot screens according to claim 1.

13. A halftone color printer including a set of halftone dot screens according to claim 10.

14. A halftone color printer including a set of halftone dot screens according to claim 11.

15. A color printing method in which each of at least three color separations of an input color image are subjected to halftone processing in accordance with a respective halftone dot screen; the method comprising:
  setting frequency and angle parameters for each of the halftone dots screens such that:
    the lowest frequency moiré produced by any combination of at least two frequency components taken from the group comprising the first and second screen harmonics, for which the sum of the harmonic orders of the frequency components in the combination is less than a predetermined value, is of a sufficiently high frequency as to be substantially unperceivable to the human visual system, and
    other moirés are also substantially unperceivable to the human visual system; and
  for each color separation:
    carrying out halftone processing in accordance with the corresponding screen parameters; and
    printing output pixels in dependence on the halftone processing of that separation said lowest frequency moiré serving to reduce the visibility of color changes caused by color plane registration variations.

16. A color printing method according to claim 15, wherein said predetermined value is six.

17. A color printing method according to claim 15, wherein the screens are embodied in threshold matrices stored in or on a computer readable medium, the threshold matrix for each screen defining a portion of a cell grid with each cell delimiting a site for formation of a clustered dot in dependence on threshold values held in the matrix, the full cell grid being formable by tessellation of said cell grid portion and being angled at angle α to the matrix where tan α is a rational number.

18. A color printing method according to claim 15, wherein the dots of each screen run in two orthogonal directions with equal periods in each direction, and each screen is embodied in a respective square N×N threshold matrix stored in or on a computer readable medium where N is an integer representing the size of the matrix in terms of the number of output pixels covered, the threshold matrix for each screen defining a portion of a cell grid with each cell delimiting a site for formation of a clustered dot in dependence on threshold values held in the matrix, the full cell grid being formable by tessellation of said cell grid portion and being angled at angle α to the matrix where tan α equals m/n with m and n being integers, the fundamental frequency LPI of each screen being related to the output-pixel resolution DPI by:

$$LPI=\{DPI/(N)\}\times\sqrt{(m^2+n^2)}$$

19. A color printing method according to claim 18, wherein the halftone dot screens form a set that is one of the group comprising the following sets of non-regular clustered-dot screens:

| Separation | m | n | N |
|---|---|---|---|
| First | 15 | 24 | 120 |
| Second | 4 | 22 | 76 |
| Third | 28 | 10 | 120 |
| First | 3 | 5 | 124 |
| Second | 35 | 13 | 152 |
| Third | 7 | 43 | 148 | where the angle of each screen is given by $\tan^{-1}(m/n)$ and the screen fundamental frequency by: $LPI=\{DPI/(N)\}\times\sqrt{(m^2+n^2)}$; said group further comprising sets of screens which have substantially similar frequency and angle values to the afore-specified group members and also provide a reduced visibility of color changes caused by color plane registration variations.

20. A color printing method in which each of at least three color separations of an input color image are subjected to halftone processing in accordance with a respective halftone dot screen; the method comprising:
  carrying out halftone processing in accordance with a first set of halftone dot screens; and
  printing output pixels in dependence on the halftone processing to produce printed images;
the method further comprising:
  monitoring the printed images to detect changes in color plane registration, and
  in response to detection of changes in color plane registration, substituting a second set of halftone dot screens for said first set for subsequent halftone processing and printing;
the frequency and angle parameters of each of the halftone dots screens of said second set being such that:
  the lowest frequency moiré produced by any combination of at least two frequency components taken from the group comprising the first and second screen harmonics, for which the sum of the harmonic orders of the frequency components in the combination is less than a predetermined value, is of a sufficiently high frequency as to be substantially unperceivable to the human visual system, and other moirés are also substantially unperceivable to the human visual system; the lowest frequency moiré serving to reduce the visibility of color changes caused by color plane registration variations.

21. A color printing method according to claim 20, wherein said predetermined value is six.

22. A color printing method according to claim 20, wherein the dots of each screen of the second set run in two orthogonal directions with equal periods in each direction, and each screen is embodied in a respective square N×N threshold matrix stored in or on a computer readable medium where N is an integer representing the size of the matrix in terms of the number of output pixels covered, the threshold matrix for each screen defining a portion of a cell grid with each cell delimiting a site for formation of a clustered dot in dependence on threshold values held in the matrix, the full cell grid being formable by tessellation of said cell grid portion and being angled at angle $\alpha$ to the matrix where tan $\alpha$ equals m/n with m and n being integers, the fundamental frequency LPI of each screen being related to the output-pixel resolution DPI by:

$$LPI=\{DPI/(N)\}\times\sqrt{(m^2+n^2)}$$

23. A method of selecting a set of screens to reduce the visibility of color changes caused by color plane registration variations in a halftone color printing process, said set comprising at least two clustered-dot screens; the method comprising:

(a) determining whether the lowest frequency moiré produced by any combination of at least two frequency components, taken from the group comprising the first and second screen harmonics, for which the sum of the harmonic orders of the frequency components in the combination is less than a predetermined value six, is of a sufficiently high frequency as to be substantially unperceivable to the human visual system, and (b) in the event of a positive determination in (a), further determining whether other moirés are also substantially unperceivable to the human visual system.

24. A method according to claim 23, wherein said predetermined value is six.

25. A method according to claim 23, wherein the dots of each clustered-dot screen run in two orthogonal directions with equal periods in each direction, and each clustered-dot screen is embodied in a respective square N×N threshold matrix stored in or on a computer readable medium where N is an integer representing the size of the matrix in terms of the number of output pixels covered, the threshold matrix for each screen defining a portion of a cell grid with each cell delimiting a site for formation of a clustered dot in dependence on threshold values held in the matrix, the full cell grid being formable by tessellation of said cell grid portion and being angled at angle $\alpha$ to the matrix where tan $\alpha$ equals m/n with m and n being integers, the fundamental frequency LPI of each screen being related to the output-pixel resolution DPI of a target printer by:

$$LPI=\{DPI/(N)\}\times\sqrt{(m^2+n^2)}.$$

* * * * *

UNITED STATES PATENT AND TRADEMARK OFFICE
CERTIFICATE OF CORRECTION

PATENT NO. : 8,355,189 B2  Page 1 of 1
APPLICATION NO. : 12/780222
DATED : January 15, 2013
INVENTOR(S) : Omri Shacham et al.

It is certified that error appears in the above-identified patent and that said Letters Patent is hereby corrected as shown below:

In column 14, line 25, in Claim 18, after "LPI={DPI/($N$)}×√$(m^2+n^2)$" insert -- . --.

In column 15, line 27, in Claim 22, after "LPI={DPI/($N$)}×√$(m^2+n^2)$" insert -- . --.

Signed and Sealed this
Ninth Day of April, 2013

Teresa Stanek Rea
*Acting Director of the United States Patent and Trademark Office*